Inventor:
William E. Glenn Jr.,
by John J. Kissane
His Attorney.

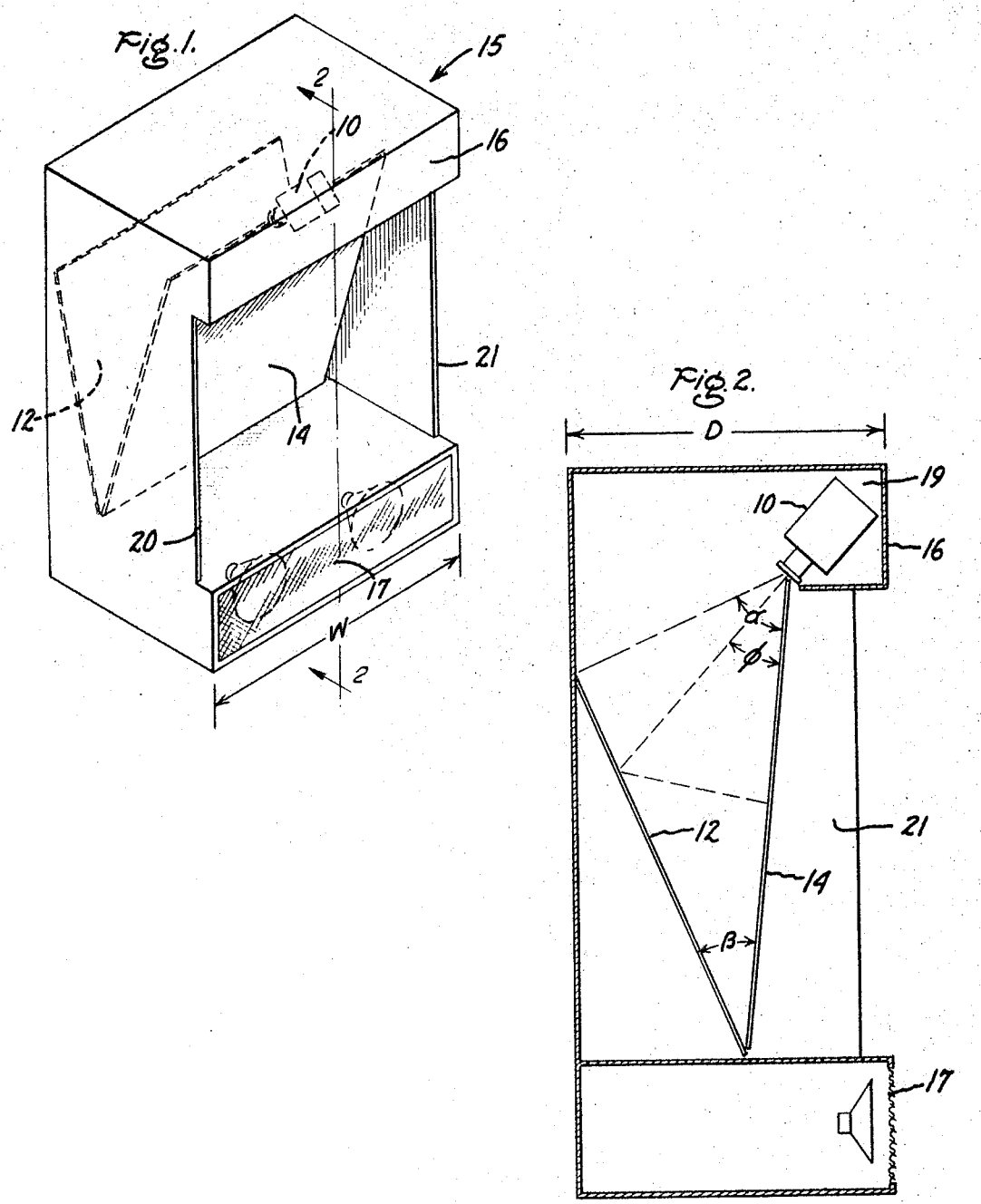

United States Patent Office 3,462,214
Patented Aug. 19, 1969

3,462,214
CONFIGURATION FOR BACK PROJECTION
William E. Glenn, Jr., Scotia, N.Y., assignor to General
Electric Company, a corporation of New York
Filed Feb. 1, 1967, Ser. No. 613,243
Int. Cl. G03b 21/14, 21/28
U.S. Cl. 353—38                            4 Claims

ABSTRACT OF THE DISCLOSURE

A back projection system 18 inches in depth is constructed by mounting the projector above and at a 30° angle with respect to the plane of a composite high gain projection screen having an integrally constructed Fresnel lens component. The Fresnel lens component inhibits the formation of areas of high intensity illumination upon the front face of the projection screen. An image projected at an angle of 60° upon a mirrored surface situated at a 30° angle with the projection screen is reflected to impinge orthorgonally upon the back surface of the screen thereby maximizing the gain of the projection system. The location of the projector also permits a cabinet arrangement having an excellent speaker location.

---

Figure 3:
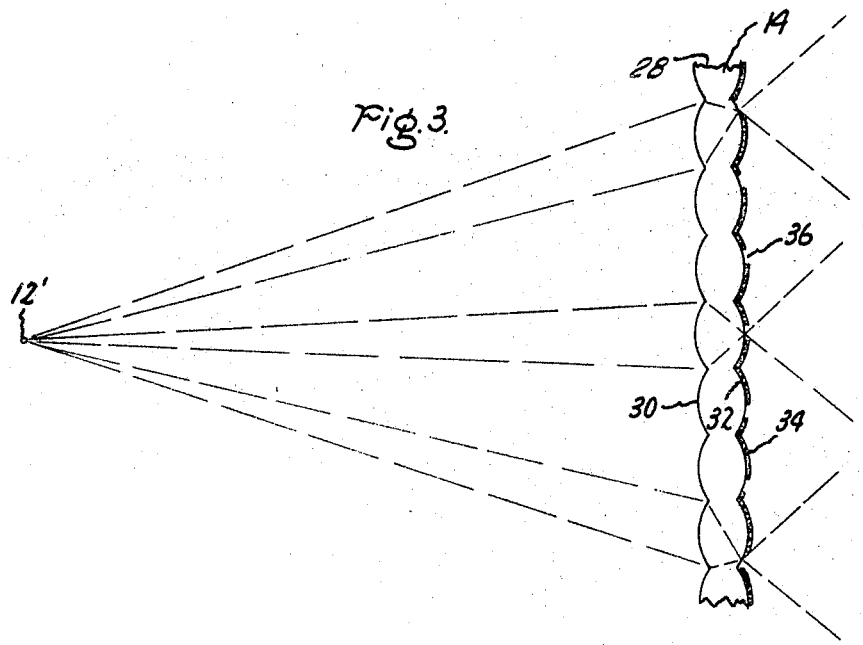

This invention relates to back projection systems for pictorial displays and in particular to a thin depth configuration for a back projection system characterized by the combination of wide angle projection and a Fresnel lens component in the projection path of the image.

The commercial desirability of thin depth cabinet structures as furniture pieces has revived the interest of designers in back projection systems in attempts to alter the general cubic configuration of conventional pictorial display devices. In general, thin depth back projection systems employ a reflecting surface to transmit the impinging light from a projector to the back surface of a projection screen in order to produce an image viewable upon the front face of the screen. The physical structure of the projection screen generally functions to diffuse the projected light rays passing through the screen and the viewing angle of the screen is determined primarily by the degree of light ray diffusion produced by the screen. The employment of a wide angle projection lens to minimize the distance from the projector to the reflecting surface however generally has been limited because of the production of hot spots, e.g. areas of high intensity illumination, at the center of the viewing screen when the projection angle exceeds 35°. Prior attempts to inhibit the formation of hot spots in back lenticulated projection screens by the utilization of a Fresnel lens having a focal length slightly shorter than the throw distance of the projector have proved to be unsuccessful because of the formation of circular patterns, or moire, produced by reinforcement of selected light rays passing through the separate Fresnel and lenticular lens elements. The lack of success in increasing the projection angle by the incorporation of a Fresnel lens intermediate a back lenticulated projection screen and the reflecting surface generally limited further experimentation directed toward increasing the projection angle by means of Fresnel lenses and projection angles of 35° generally have been accepted as the permissible upper limit for back projection systems. Thus, notwithstanding the desirability of wide angle projection angles to minimize the depth of the projection system, projection angles in the range of 50° to 60° heretofore have not been permissible because of the inferior quality of the observable picture.

It is therefore an object of this invention to provide a geometric configuration of component parts for a thin depth back projection system to produce high quality pictures.

This and other objects of this invention are accomplished in a back projection system for pictorial displays wherein an image projected upon a reflective surface is transmitted to the back face of a light diffusing projection screen to produce a viewable picture upon the front face of the projection screen remote from the reflective surface at a viewing angle proportional to the degree of diffusion of the screen by incorporating within the projection system means for projecting an image at an angle in the range of 50° to 60° and Fresnel lens components, e.g. a lens having small concentric stepped zones for refracting light, positioned in the projected path of the image to inhibit the formation of areas of high intensity illumination on the front face of the projection screen. By disposing the back projection screen and the reflecting surface at an angle in the range of 32.5° to 30° relative to each other, a proper centering of the image upon the projection screen is obtained. As compared with projection system of the prior art wherein a maximum projection angle of approximately 35° was utilized, the unique combination of a projection angle in the range of 50° to 60° and a Fresnel lens component in the projected path permits a 25% increase in picture area for a given enclosure depth.

The projector of this invention is situated above and slightly forward of the projection screen with the axis of the projector being disposed relative to the plane of the projection screen at an angle equal to one-half the projection angle, e.g. in the range of 25° to 30°. This configuration assures that the projected image will impinge upon the reflective surface at a location and angle such that the reflected rays strike the center of the projection screen at approximately a perpendicular angle thereby producing a minimum of dispersion of the impinging rays and a high gain for the projection system.

Because the axis of the projector is disposed relative to the projection screen to form an angle with the plane of the projection screen equal to one-half the projection angle, the employment of a wide angle projection lens, e.g. in the range of 50° to 60°, permits the angular positioning of the projector at an attitude departing substantially from the horizontal thereby further minimizing the depth of the cabinet necessary to enclose the system. The geometric configuration of the components of the back projection system therefore permits an enclosure which departs drastically from the traditionally cube-shaped projection devices and approaches more nearly the proportions of other furniture devices, e.g. bookshelves, china cabinets, etc.

When the projection screen employed in the wide angle projection system of this invention diffuses the projected light rays by means of lenticular lens components situated along the back face of the projection screen proximate the reflecting surface, optical registration between the Fresnel lens components and the lenticular lens components is required to inhibit the formation of moire. Preferably the optical registration between the Fresnel lens components and the lenticular lens components is accomplished by forming both the Fresnel lens components and the lenticular lens components in a unitary projection screen such as described in application Ser. No. 613,323 entitled "Lenticular Back Projection Screen," filed concurrently herewith and assigned to the assignee of the present invention. When the light diffusion of the projection screen is accomplished by means other than by lenticular lens components, e.g. the diffusion produced by the grain distribution of glass within ground glass screens, no optical registration is required and the Fresnel lens components need only be situated within the path of the projected image to refract the projected light rays thereby preventing the formation of areas of high intensity illumination at the center of the screen.

Figure 4:
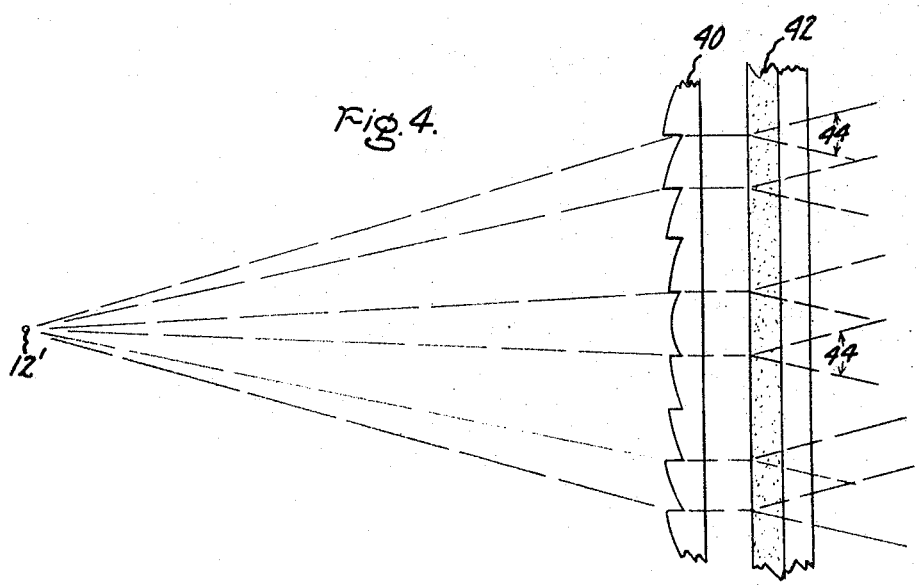

These and various other objects, features and advantages of the invention will be better understood from the following description taken in connection with the accompanying drawings in which:

FIG. 1 is an isometric view of a back projection system having component parts disposed in accordance with this invention, FIG. 2 is a sectional view taken along lines 2—2 of FIGURE 1, FIG. 3 is a horizontal sectional view of a lenticulated back projection screen suitable for use with a wide angle projector, and FIG. 4 is a horizontal section of the lens elements in the projected path of the image for back projection systems utilizing a ground glass screen.

The back projection system of this invention, as shown in FIGS. 1 and 2, generally includes a wide angle projector 10 to project an image on a mirrored surface 12 which, in turn, reflects the image upon the back face of projection screen 14 to present a viewable picture on the front face of the screen. In order to minimize the depth of the back projection system for a given picture dimension, projector 10 is provided with a wide angle lens which produces a projection angle $\alpha$ in the range of 50° to 60°. For optimum centering and brightness employing a projection angle within the range of 50° to 60°, mirrored surface 12 and projection screen 14 are disposed relative to each other at an angle $\beta$ preferably equal to $$45° - \frac{\alpha}{4}$$

wherein $\alpha$ is the projection angle of projector 10, e.g. the angle $\beta$ formed between the mirrored surface and the projection screen lies in the range of 32.5° to 30°. Projector 10 is situated above and slightly forward of projection screen 14 with the axis of the projector forming an angle $\phi$ with the plane of the projection screen equal to one-half the projection angle. Thus the angle $\beta$ formed between mirrored surface 12 and projection screen 14 generally differs from the angle $\phi$ formed by the axis of projector 10 relative to the projection screen except for the maximum projection angle of 60° when both angles $\phi$ and $\beta$ are equal to 30°.

The light rays from projector 10 form a 30°–60°–90° right triangle with reflecting surface 12 when a 60° projection angle is employed with projector 10. The rays forming the center of the pictorial display, and therefore being the most observable, impinge at an angle of 60° upon point 12' of mirrored surface 12 with a 60° projection angle and the impinging rays are reflected at a 60° angle relative to the plane of mirrored surface 12 to strike upon the center of the projection screen at an angle of 90°. The orthogonal relationship between the projection screen and the rays impinging upon the back surface of the projection screen minimizes the refraction of the screen so that a maximum of brightness is obtainable for a fixed projection wattage. Because the lens of projector 10 can be designed for a fixed throw distance due to its fixed position within the back projection system, the cost of the projector and the number of elements within the projector can be reduced to a minimum.

Mirrored surface 12 can be any smooth, non-light absorbing material and preferably is a front reflecting mirrored surface to permit a minimum of loss of light intensity and a minimum of image distortion.

The geometrical configuration of the component elements of the back projection system disposed in accordance with this invention lends itself for enclosure in a generally C-shaped cabinet 15 having a maximum depth D of approximately 18 inches and a width W of approximately 40 inches. The projection screen itself is disposed at an attitude sloping slightly from the vertical with the top of the screen protruding furthest forwardly and extending to a position recessed approximately 5 inches from the frontmost face 16 of the cabinet structure. The disposition of the axis of the projector at an angle $\phi$ in the range of 25° to 30° relative to the projection screen affords a substantial departure of the projector axis from the horizontal plane and permits the enclosure of projector 10 within a cabinet structure only 5 inches deep. Although a greater saving in the depth of the overall system can be accomplished by the disposition of the projection screen at a perfectly vertical attitude, such a configuration is not desirable because light reflecting off the front face of a vertical screen unduly interferes with viewing. Because base portion 17 of the cabinet structure must protrude to a distance approximately equal to the depth D of upper overhang 19 in order to stabilize the furniture piece, the base portion affords an excellent location for speaker or other elements associated with the projection system. The recessing of the picture screen below the overhang and intermediate support sides 20 and 21 assures the positioning of the picture screen in a darkened confine thereby enhancing the contrast of the screen during daylight viewing.

A back projection screen 14 suitable for employment with a projection angle in the range of 50° to 60° is depicted in FIG. 3 and generally includes a transparent sheet 28, e.g. clear thermoplastic or transparent silicon rubber, cylindrically lenticulated along the back face 30 proximate mirrored surface 12. The front face 32 of the screen also is cylindrically lenticulated with the thickness of the screen and the arcual configuration of the front and back cylindrical lenses being such that the light rays impinging on the back cylindrical lenses are focused at selected intervals along front face 32 of the screen. A dark overcoating 34 selectively covers front face 32 at all points except for the foci of the back cylindrical lenses along the front face of the screen to provide a darkened appearance for the screen while permitting the transmission of light rays forming the picture through the screen at clear sections 36.

Clear sections 36 are located upon each front cylindrical lens at a position intersected by an unrefracted ray projected from point 12' of mirrored surface 12 through the center of the directly opposed back cylindrical lens and therefore the location of adjacent clear sections 36 relative to the center of their associated cylindrical lenses are arcually displaced along the surface of the cylindrical lens with increasing departure of the cylindrical lens from the center of the screen. Because each clear section is situated upon its associated cylindrical lens at a slightly different arcual segment of the cylindrical lens than an adjacent clear section, the clear sections form a stepped zone lens configuration characteristic of Fresnel lenses. Thus clear sections 36 function as a Fresnel lens to refract light rays focused upon the clear sections by the back cylindrical lenses. Although the optical alignment between the back cylindrical lenses and the Fresnel lens components of clear sections 36 along the front cylindrical lenses is by the focusing action of the back cylindrical lenses upon the clear sections, any other method of optical alignment, e.g. forming both the cylindrical and Fresnel elements as a composite lens along the back face 30 of the projection screen, also can be employed without departing from the scope of this invention.

In the projection of a picture, the center ray of a projected image is reflected by point 12' of mirrored surface 12 upon the back face 30 of the projection screen 14 to be focused by the cylindrical lenses forming the back face of the screen upon clear sections 36 intermediate overcoating 34 to provide a picture viewable upon the front face of the screen. Thus the single back projection screen depicted in FIG. 3 functions both to diffuse the projected light rays passing through the screen by means of the back cylindrical lenses and to refract the projected light rays by means of the Fresnel lens components situated at clear sections 36.

A more complete description of back projection screens having optically aligned lenticular lens and Fresnel lens components incorporated into a unitary screen capable of accepting projection angles in the range of 50° to 60° can be obtained by reference to previously cited application Ser. No. 613,323, entitled "Lenticular Back Projection Screen."

When a ground glass back projection screen is employed to diffuse the reflected light rays passing through the projection screen, no optical registration betweens lens elements is required and the Fresnel lens component need only be situated within the path of the projected image between the reflecting surface and the ground glass projection screen. Such a system is depicted in FIG. 4 wherein the center ray of the projected image reflected from point 12' of mirrored surface 12 is refracted by Fresnel lens 40 situated intermediate reflecting surface 12 and ground glass projection screen 42 before being diffused by the grain orientation of the ground glass screen to provide a suitable viewing angle 44. Fresnel lens 40 inhibits the formation of areas of excessive light intensity at the center of projection screen 42 and projection angles in the range of 50° to 60° can be employed to reduce the depth of the projection system.

While several examples of this invention have been shown and described, it will be apparent to those skilled in the art that many changes and modifications may be made without departing from this invention in its broader aspects; and therefore the appended claims are intended to cover all such changes and modifications as fall within the true spirit and scope of this invention.

What I claim as new and desire to secure by Letters Patent of the United States is:

1. In a back projection system for pictorial displays wherein an image projected upon a reflective surface is transmitted to the back face of a light diffusing projection screen to produce a viewable picture upon the front face of the projection screen remote from the reflective surface at a viewing angle proportional to the degree of diffusion of said screen, the improvement comprising means for projecting of said image at an angle in the range of 50° to 60°, and Fresnel lens components positioned in the projected path of said image to inhibit the formation of areas of high intensity illumination upon the front face of said projection screen.

2. A back projection system according to claim 1 wherein said projection screen and said reflecting surface are angularly disposed relative to each other, the edge of said projection screen remote from said projecting means intersecting said reflecting surface at an angle in the range of 32.5 to 30°.

3. A back projection system according to claim 2 wherein said projection means is situated at the end of said projection screen remote from the intersection of said screen with said reflecting surface, the axis of said projection means being disposed at an angle in the range of 25° to 30° with said projection screen, one edge of the projected beam from said projection means being parallel to and coextensive with the back face of said projection screen to cast an image along the entire length of said reflecting surface.

4. A back projection system according to claim 1 wherein said projection screen is ground glass and said Fresnel lens components are situated intermediate said reflecting surface and said projection screen.

References Cited

UNITED STATES PATENTS

| | | | |
|---|---|---|---|
| 2,012,501 | 8/1935 | Erickson et al. | 88—24 |
| 2,086,182 | 7/1937 | Dvornik | 88—24 |
| 2,381,614 | 8/1945 | Möller et al. | 88—24 |
| 2,567,654 | 9/1951 | Siezen | 88—24 |
| 2,588,373 | 3/1952 | Erban | 350—211 XR |

FOREIGN PATENTS

| | | |
|---|---|---|
| 699,594 | 12/1930 | France. |
| 269,314 | 11/1929 | Italy. |

NORTON ANSHER, Primary Examiner

R. P. GREINER, Assistant Examiner

U.S. Cl. X.R.

353—77